US009604887B2

(12) United States Patent
Evans

(10) Patent No.: US 9,604,887 B2
(45) Date of Patent: Mar. 28, 2017

(54) BETAINE BASED ORGANIC FERTILIZER

(71) Applicant: True Organic Products, Inc., Helm, CA (US)

(72) Inventor: Jacob Matthew Evans, Pebble Beach, CA (US)

(73) Assignee: True Organic Products, Inc., Helm, CA (US)

( * ) Notice: Subject to any disclaimer, the term of this patent is extended or adjusted under 35 U.S.C. 154(b) by 10 days.

(21) Appl. No.: 14/690,621

(22) Filed: Apr. 20, 2015

(65) Prior Publication Data

US 2016/0304409 A1    Oct. 20, 2016

(51) Int. Cl.
C05F 1/00    (2006.01)
C05F 5/00    (2006.01)

(52) U.S. Cl.
CPC .............. C05F 1/002 (2013.01); C05F 5/00 (2013.01)

(58) Field of Classification Search
CPC ....................................... C05F 1/002
USPC ............................................. 71/16
See application file for complete search history.

(56) References Cited

U.S. PATENT DOCUMENTS

| 1,501,916 A | 7/1924 | Nikaido |
| 1,599,185 A | 9/1926 | Reich |
| 1,631,252 A | 6/1927 | Dickerson |
| 2,049,524 A | 8/1936 | Stillwell |
| 2,117,087 A | 5/1938 | Formhals |
| 2,315,422 A | 3/1943 | Hildebrandt |
| 2,626,237 A | 1/1953 | Warren |
| 2,738,264 A | 3/1956 | Watson |
| 2,797,986 A | 7/1957 | Zirm |
| 3,445,220 A | 5/1969 | Anderson |
| 3,983,255 A | 9/1976 | Bass |
| 4,126,439 A | 11/1978 | Stekoll |
| 4,230,485 A | 10/1980 | Ohlrogge |
| 4,383,846 A | 5/1983 | Newsom |
| 4,424,151 A | 1/1984 | Grealy et al. |
| 4,604,125 A | 8/1986 | Robertiello et al. |
| 4,743,287 A | 5/1988 | Robinson |
| 4,997,469 A | 3/1991 | Moore |
| 5,177,008 A | 1/1993 | Kampen |

(Continued)

FOREIGN PATENT DOCUMENTS

| CN | 102391030 | 3/2012 |
| CN | 102674972 | 9/2012 |

(Continued)

OTHER PUBLICATIONS

Wiedmeier et al., "Effects of Concentrated Separator Dried Beet Pulp on Nutrient Digestibility, Milk Production, and Preference of Holstein Cattle", Journal of Dairy Science, 1994, vol. 77, No. 10, pp. 3051-3057.

(Continued)

Primary Examiner — Wayne Langel
(74) Attorney, Agent, or Firm — Hawley Troxell Ennis & Hawley LLP; Philip McKay

(57) ABSTRACT

An organic fertilization method is provided using betaine based organic fertilizer product and/or betaine and fish fertilizer by-product based fertilizer product. The betaine based organic fertilizer product and/or betaine and fish fertilizer by-product based fertilizer product is applied to agricultural vegetation in one of multiple forms and by one of multiple methods.

55 Claims, 2 Drawing Sheets

(56) References Cited

U.S. PATENT DOCUMENTS

| | | | |
|---|---|---|---|
| 5,177,009 A | 1/1993 | Kampen | |
| 5,393,318 A * | 2/1995 | Iizuka | C05F 1/002 71/16 |
| 5,631,001 A | 5/1997 | Harich et al. | |
| 5,772,721 A | 6/1998 | Kazemzadeh | |
| 5,851,953 A | 12/1998 | Pehu et al. | |
| 5,952,267 A | 9/1999 | Mottram | |
| 6,083,293 A | 7/2000 | Bath | |
| 6,174,472 B1 | 1/2001 | Johnson et al. | |
| 6,318,023 B1 | 11/2001 | Yamashita | |
| 6,352,569 B1 | 3/2002 | Beran et al. | |
| 6,384,266 B1 | 5/2002 | Farone et al. | |
| 6,524,600 B2 | 2/2003 | Yamashita | |
| 6,572,669 B1 | 6/2003 | Creech | |
| 6,602,824 B1 | 8/2003 | Miles et al. | |
| 7,018,669 B2 | 3/2006 | Kosaka et al. | |
| 7,045,165 B2 | 5/2006 | Westberg | |
| 7,074,251 B1 | 7/2006 | Rogers et al. | |
| 7,901,481 B2 | 3/2011 | Evans | |
| 7,927,397 B1 * | 4/2011 | Evans | C05F 1/002 71/11 |
| 8,444,742 B2 | 5/2013 | Smith et al. | |
| 2003/0066322 A1 | 4/2003 | Perriello | |
| 2003/0172697 A1 | 9/2003 | Sower | |
| 2004/0062832 A1 | 4/2004 | Kemp | |
| 2004/0065127 A1 | 4/2004 | Connell | |
| 2004/0121914 A1 | 6/2004 | Catalano | |
| 2005/0119127 A1 | 6/2005 | Cambri et al. | |
| 2006/0243009 A1 | 11/2006 | Burnham | |
| 2006/0254331 A1 | 11/2006 | Burnham | |
| 2007/0261451 A1 | 11/2007 | Beckley et al. | |
| 2013/0130902 A1 | 5/2013 | Roose et al. | |
| 2014/0047881 A1 | 2/2014 | Roberts | |

FOREIGN PATENT DOCUMENTS

| | | | |
|---|---|---|---|
| CN | 102875238 | | 1/2013 |
| CN | 103524175 | | 1/2014 |
| CN | 103724128 | | 4/2014 |
| CN | 103936500 | | 7/2014 |
| CN | 104058810 | | 9/2014 |
| DE | 4324823 | | 2/1994 |
| GB | 663133 | | 12/1951 |
| JP | 63-107907 | | 5/1988 |
| JP | 1-208386 | * | 8/1989 |
| JP | 01208386 | | 8/1989 |
| JP | 06107511 | | 4/1994 |
| JP | 2004-168614 | | 6/2004 |
| KR | 100839201 | | 6/2008 |
| KR | 101361521 | | 2/2014 |
| PL | 159135 | | 11/1992 |

OTHER PUBLICATIONS

Kearney et al., "Raw Juice Chromatographic Separation Process", Proceedings from the 28th Biennial ASSBT Meeting, Operations, New Orleans, LA, Mar. 8-11, 1995, Amalgamated Research, Inc., pp. 1-5.

Midwest Agri Commodities, "Raffinate (Desugared Beet Molasses)", Jul. 10, 2001, 1 page.

Diaz-Zorita, "Applications of Foliar Fertilizers Containing Glycinebetaine Improve Wheat Yields," Argentina Journal of Agronomy and Crop Science (Impact Factor: 2.62), Dec. 2001: 186(3): 209-215.

Decloux et al. "Interest of electrodialysis to reduce potassium level in vinasses." Desalination 146 (2002) pp. 393-398.

Naidu, et al., "Glycinebetaine foliar application increases pasture winter growth and milk yield," Proceedings of the 11th Australian Agronomy Conference, Feb. 2-6, 2003, 2 pages, Geelong, Victoria.

Evans, Analytical Data, 2004-2006.

Evans, "Concentrated Separator By-Product Based Fertilizer," U.S. Appl. No. 12/931,323, filed Jan. 27, 2011.

Gao, et al., "Effect of spraying glycine betaine on physiological responses of processing tomato under drought stress," Journal of Plant Nutrition and Fertilizer, 2012, 18(2): 426-432.

"Betaine Plant Fertilizer, Betaine Plant Fertilizer Suppliers and Manufacturers at Alibaba.com," [online], [retrieved Feb. 24, 2015]. Retrieved from the internet <URL: http://www.alibaba.com/showroom/betaine-plant-fertilizer.htm>.

Evans, "Betaine Based Organic Fertilizer," U.S. Appl. No. 14/820,033, filed Aug. 6, 2015.

Evans, "PH Adjusted Betaine Based Organic Fertilizer," U.S. Appl. No. 14/863,984, filed Sep. 24, 2015.

* cited by examiner

BETAINE BASED ORGANIC FERTILIZER

BACKGROUND

Over the years, a number of different types of fertilizer compositions have been developed and employed in agriculture. In the recent past, synthetic chemical fertilizer compositions dominated the fertilizer marketplace. However, more recently, there has been increasing public awareness of, and concern regarding, the potential link between synthetic chemical fertilizer use and human disease and/or poisoning. Consequently, there has been a significant movement toward "organic" fertilizer compositions which do not rely on synthetic chemicals and which are typically derived from natural sources.

As a result of the increased demand for organic fertilizer compositions, there is significant interest in the development of new and/or better organic fertilizer compositions that provide the desirable and/or necessary nutrients, and that reduce the risk of introducing pathogens into the food supply.

The desirable nutrients include, but are not limited to, bioavailable phosphorous, potassium and nitrogen. These nutrients must not only be present, but they must be present in sufficient concentrations to be beneficial to agricultural vegetation. In addition, the organic fertilizer compositions must be in a form that is readily applied to the agricultural vegetation and/or has minimum impact on the surrounding community. To this end, the desirable characteristics of organic fertilizer compositions include, but are not limited to: the ability to directly apply the organic fertilizer compositions in a low viscosity liquid form; the ability to inject and/or add the organic fertilizer compositions into irrigation streams; time-released nitrogen components which become bioavailable to agricultural vegetation by beneficial microbial digestion in soil; the elimination of chemical crop burning; minimal odor associated with the organic fertilizer composition during and/or after application; and the minimization of undesirable runoff situations.

In an effort to find a cost-efficient organic fertilizer composition, numerous attempts have been made to utilize waste products generated by fermentation and/or refined sugar processing as an organic fertilizer composition. These attempts have included deriving organic fertilizer compositions from malt extracts and/or spent grain liquor; treating molasses to recover potash and nitrogen in solid form for use as an organic fertilizer composition; deriving organic fertilizer compositions from commercially available molasses; deriving thixotrophic fertilizer compositions from organic materials including molasses; and deriving organic fertilizer compositions from yeast/black strap molasses. However, these organic fertilizer compositions typically lack the requisite concentrations of nutrients to be beneficial to agricultural vegetation.

Some efforts to "boost" the concentrations of nutrients in these waste by-product based organic fertilizer compositions require significant chemical processing and/or the addition of synthetically derived chemicals. However, this approach often defeated the original goal of developing an "organic" fertilizer composition, and in many cases proved too costly to be economically feasible. In other cases, attempts have been made to add relatively organic materials to other organic fertilizers, such as fertilizer products derived from fish. For example, in some cases, attempts were made to add relatively organic materials to the waste product based organic fertilizer compositions such as enzyme digested fish or "liquid fish." However, enzyme digested fish is created by adding an enzyme that virtually "dissolves" the fish into an enzyme digested fish solution. Since the fish is composed of mostly water to start with, the resultant enzyme digested fish solution is also mostly water, typically 80% or more water. As a result, the concentrations of desirable nutrients, particularly nitrogen, are still low. In addition, the enzyme digested fish solution, and virtually any fertilizer utilizing the enzyme digested fish solution, has an extremely strong, and unpleasant, odor. Consequently, the use of any fertilizer utilizing the enzyme digested fish solution is often restricted to areas far removed from human communities. However, with the encroachment of human communities on virtually all farm lands throughout the world, farming locations sufficiently removed from human communities to allow non-problematic use of the enzyme digested fish solution are becoming rarer and rarer.

As noted, some sources of fertilizer nutrients were traditionally taught to be too expensive and/or non-organic. An N-trimethylated amino acid historically used as a feed additive for many animal species, betaine is a source of fertilizer nutrients traditionally taught to be both non-organic and too expensive for organic fertilizer use. Given the cost of betaine, and the fact that betaine was considered non-organic, traditional teaching was that it was more cost effective for a user seeking fertilizer to purchase urea, which contains a higher percentage of nitrogen than betaine. Thus, given the initial expense of betaine, and its relatively small percentage of nitrogen, traditional agriculture largely ignored betaine as a viable fertilizer.

As a result, there is a current need for an environmentally benign fertilizer derived from a natural organic source that provides sufficient levels of usable nutrients but does not require significant processing and does not raise environmental concerns.

SUMMARY

In accordance with one embodiment, a method for organic fertilization using betaine is disclosed.

As discussed below, betaine is a by-product of the desugaring of beet molasses and is therefore typically readily available. Despite being readily available, traditional agricultural teaching was that betaine was not an economically viable fertilizer component because of the initial expense of betaine, the relatively small percentage of nitrogen made available through betaine, and that betaine was historically not known to be an organic fertilizer nutrient. However, in contrast to traditional teachings, and as a result of extensive research and experimentation, the Inventor discovered the unexpected result that, properly processed, betaine can meet the USDA National Organic Program standards and therefore can be classified as an organic fertilizer and be readily used as an organic fertilizer.

In one embodiment, a quantity of betaine is obtained.

In one embodiment, a betaine based organic fertilizer product is created by applying/adding the obtained betaine directly to the agricultural vegetation and/or the fields/soil/substrate supporting the agricultural vegetation.

In one embodiment, a betaine based organic fertilizer product is created by adding the betaine directly to an irrigation system servicing the agricultural vegetation.

In one embodiment, a betaine based organic fertilizer product is created by applying/adding the obtained betaine directly to the agricultural vegetation and/or the fields/soil/substrate supporting the agricultural vegetation in a concentration of greater than 90% betaine.

In one embodiment, a betaine based organic fertilizer product is created by applying/adding the obtained betaine directly to the agricultural vegetation and/or the fields/soil/substrate supporting the agricultural vegetation in a concentration of 100% betaine.

In one embodiment, a betaine based organic fertilizer product is created by adding the betaine directly to an irrigation system servicing the agricultural vegetation.

In one embodiment, a betaine based organic fertilizer product is created by adding betaine in a concentration of greater than 90% directly to an irrigation system servicing the agricultural vegetation.

In one embodiment, a betaine based organic fertilizer product is created by adding 100% betaine directly to an irrigation system servicing the agricultural vegetation.

In one embodiment, a betaine based organic fertilizer product is created by adding betaine to a liquid base, such as water or any other liquid mixture, to obtain a desired concentration of betaine. In one embodiment, the desired concentration of betaine is 20% to 60%.

In one embodiment, a betaine based organic fertilizer product is created by adding the obtained betaine to a semi-liquid base and/or mixing the obtained betaine with one or more solids or semi-solids, and in one embodiment processing the mixture, to achieve a desired concentration of betaine. In one embodiment, the desired concentration of betaine is 20% to 60%.

In one embodiment, once created, the betaine based organic fertilizer product is then applied directly to the agricultural vegetation and/or the fields/soil/substrate supporting the agricultural vegetation.

In one embodiment, once created, the betaine based organic fertilizer product is then added to an irrigation system servicing the agricultural vegetation.

In one embodiment, the betaine based fertilizer product is then applied to fields of agricultural vegetation in quantities in the approximate range of 5 to 400 gallons per acre.

Using the betaine based organic fertilizer product disclosed herein, an organic fertilizer product is provided that is environmentally benign; is non-pathogenic; is derived from a natural organic source; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

In accordance with one embodiment, a process for production of a betaine and fish fertilizer by-product based fertilizer product is created by mixing betaine, a by-product of the de-sugaring of beet molasses, and fish fertilizer by-product, a by-product of fish products. In one embodiment, the raw mixture of betaine and fish fertilizer by-product is then heat treated and, in one embodiment, optionally filtered to remove suspended particular matter. In one embodiment, the heat treated mixture of betaine and fish fertilizer by-product is then cooled to yield the betaine and fish fertilizer by-product based fertilizer product. In one embodiment, the betaine and fish fertilizer by-product based fertilizer product is then applied to agricultural vegetation, either directly or by inclusion in an irrigation stream.

In one embodiment, a quantity of betaine is obtained. Betaine is a by-product of the de-sugaring of beet molasses and is therefore typically readily available.

In one embodiment, fish fertilizer by-product is then obtained. Fish fertilizer by-product is a viscous liquid by-product from the production of fish meal. Consequently, fish fertilizer by-product is also typically readily available.

In one embodiment, the fish fertilizer by-product is mixed with the betaine such that the resulting raw mixture of betaine and fish fertilizer by-product is 70% to 80% fish fertilizer by-product and 30% to 20% betaine. In one embodiment, the fish fertilizer by-product is added to the betaine such that the resulting raw mixture of betaine and fish fertilizer by-product is 40% to 60% fish fertilizer by-product and 60% to 40% betaine. In other embodiments, the betaine is added to the fish fertilizer by-product such that the resulting raw mixture of betaine and fish fertilizer by-product is any desired percentage concentration of betaine and fish fertilizer by-product.

In one embodiment, the raw betaine and fish fertilizer by-product is filtered to remove suspended particular matter. In one embodiment, filtration is provided using a wire mesh size in a range of 50 to 200.

In one embodiment, the raw mixture of betaine and fish fertilizer by-product is then heat treated. In one embodiment, the heat treatment is performed in a range of about 130 to 200 degrees Fahrenheit (F) for between 4 hours to 15 days. In one embodiment, the raw mixture of betaine and fish fertilizer by-product is aerated.

In one embodiment, the heat treated mixture of betaine and fish fertilizer by-product is then cooled to yield the betaine and fish fertilizer by-product based fertilizer product.

In one embodiment, the heat treated mixture of betaine and fish fertilizer by-product is filtered pre- and/or post-cooling. In one embodiment, filtration is provided using a wire mesh size in a range of 50 to 200.

In one embodiment, the betaine and fish fertilizer by-product based fertilizer product is then applied to fields of agricultural vegetation in quantities in the approximate range of 5 to 400 gallons per acre. In one embodiment, the betaine and fish fertilizer by-product based fertilizer product disclosed herein is applied to the fields of agricultural vegetation either directly or by inclusion in an irrigation stream.

Using the process for production of a betaine and fish fertilizer by-product based fertilizer product disclosed herein, a betaine and fish fertilizer by-product based fertilizer product is provided that is environmentally benign; is non-pathogenic; is derived from a natural organic source; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

As discussed in more detail below, using the below embodiments, with little or no modification and/or user input, there is considerable flexibility, adaptability, and opportunity for customization to meet the specific needs of various users under numerous circumstances.

BRIEF DESCRIPTION OF THE DRAWINGS

Common reference numerals are used throughout the FIG.s and the detailed description to indicate like elements.

Figure 1:
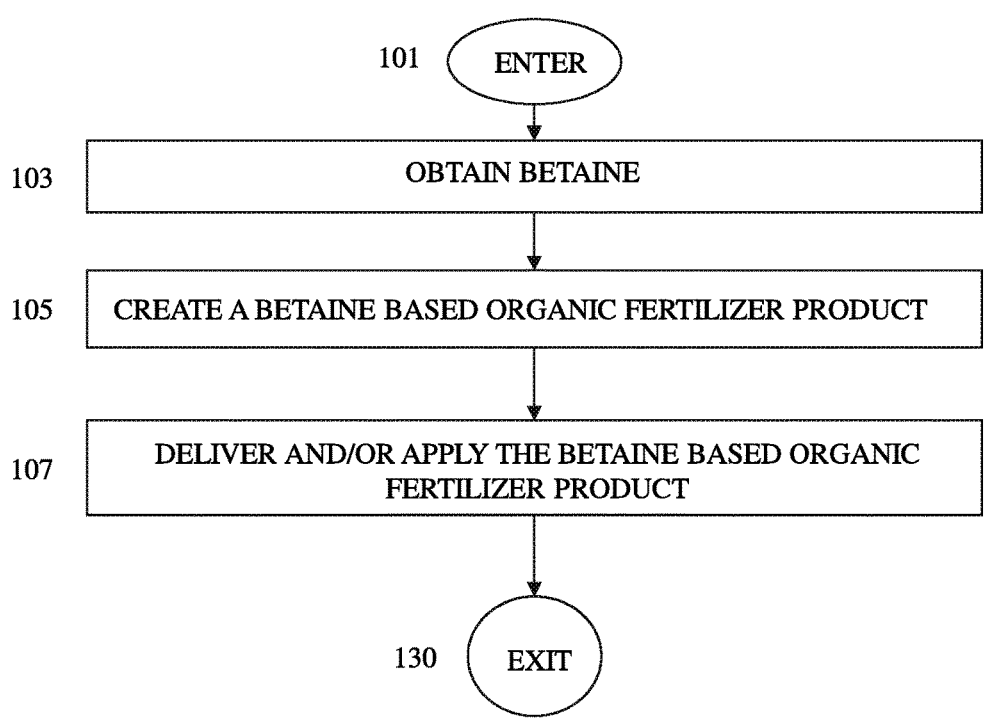
FIG. 1 is a flow chart of a method for organic fertilization using betaine.

One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

As used herein, the term "organic fertilizer" means an ingredient or product that may be used in certified organic crop production in accordance with USDA National Organic Program standards.

Currently, 7 CFR 205.203 provides the practice standard for certified organic crop production. The regulations under 7 CFR 205.203 provide the following:

(a) The producer must select and implement tillage and cultivation practices that maintain or improve the physical, chemical, and biological condition of soil and minimize soil erosion.

(b) The producer must manage crop nutrients and soil fertility through rotations, cover crops, and the application of plant and animal materials.

(c) The producer must manage plant and animal materials to maintain or improve soil organic matter content in a manner that does not contribute to contamination of crops, soil, or water by plant nutrients, pathogenic organisms, heavy metals, or residues of prohibited substances. Animal and plant materials include:

(1) Raw animal manure, which must be composted unless it is:

(i) Applied to land used for a crop not intended for human consumption;

(ii) Incorporated into the soil not less than 120 days prior to the harvest of a product whose edible portion has direct contact with the soil surface or soil particles; or (iii) Incorporated into the soil not less than 90 days prior to the harvest of a product whose edible portion does not have direct contact with the soil surface or soil particles;

(2) Composted plant and animal materials produced through a process that:

(i) Established an initial C:N ratio of between 25:1 and 40:1; and (ii) Maintained a temperature of between 131° F. and 170° F. for 3 days using an in-vessel or static aerated pile system; or (iii) Maintained a temperature of between 131° F. and 170° F. for 15 days using a windrow composting system, during which period, the materials must be turned a minimum of five times.

(3) Uncomposted plant materials.

(d) A producer may manage crop nutrients and soil fertility to maintain or improve soil organic matter content in a manner that does not contribute to contamination of crops, soil, or water by plant nutrients, pathogenic organisms, heavy metals, or residues of prohibited substances by applying:

(1) A crop nutrient or soil amendment included on the National List of synthetic substances allowed for use in organic crop production;

(2) A mined substance of low solubility;

(3) A mined substance of high solubility: Provided, That, the substance is used in compliance with the conditions established on the National List of nonsynthetic materials prohibited for crop production;

(4) Ash obtained from the burning of a plant or animal material, except as prohibited in paragraph (e) of this section: Provided, That, the material burned has not been treated or combined with a prohibited substance or the ash is not included on the National List of nonsynthetic substances prohibited for use in organic crop production; and (5) A plant or animal material that has been chemically altered by a manufacturing process: Provided, that, the material is included on the National List of synthetic substances allowed for use in organic crop production established in §205.601.

(e) The producer must not use:

(1) Any fertilizer or composted plant and animal material that contains a synthetic substance not included on the National List of synthetic substances allowed for use in organic crop production;

(2) Sewage sludge (biosolids) as defined in 40 CFR part 503; and (3) Burning as a means of disposal for crop residues produced on the operation: Except, That, burning may be used to suppress the spread of disease or to stimulate seed germination.

As used herein, the term "fish fertilizer by-product" includes liquid fish fertilizer by-product, such as enzyme digested fish, and/or any solid and/or semi-solid fish fertilizer by-product, such as fish meal, and/or any liquid, semi-solid, or solid including fish and/or fish waste materials, as discussed herein, and/or as known in the art at the time of filing, and/or as developed after the time of filing.

In accordance with one embodiment, a method for organic fertilization using betaine includes creating a betaine based organic fertilizer product and applying the betaine based organic fertilizer product to agricultural vegetation and/or the fields/soil/substrate supporting the agricultural vegetation as a method of organic fertilization of the agricultural vegetation.

FIG.1 shows a flow chart of a process for organic fertilization of agricultural vegetation using betaine 100 in accordance with one embodiment. As shown in FIG.1, process for organic fertilization of agricultural vegetation using betaine 100 begins at enter operation 101 and process flow proceeds to OBTAIN BETAINE OPERATION 103.

In one embodiment, at OBTAIN BETAINE OPERATION 103 a quantity of betaine is obtained.

When beet molasses is de-sugared by chromatographic extraction techniques, two by-products are produced: concentrated molasses solids and betaine. Thus, betaine is a by-product of the de-sugaring of beet molasses and therefore is readily available. In the chromatic extraction desugaring process, considerable amounts of high-purity betaine are recovered and, traditionally, this betaine was used as a liquid animal feed supplement.

A discussion of the improved chromatographic separation process currently practiced by many sugar refiners is provided in "Raw Juice Chromatographic Separation Process" published in the Proceedings from the 28th Biennial ASSBT Meeting, Operations, New Orleans, La., Mar. 8-11, 1995, by Kearney, Kochergin, Petersen, Velasquez and Jacob of Amalgamated Research Inc.

As also noted above, despite being readily available, traditional agricultural teaching was that betaine was not an economically viable fertilizer component because of the initial expense of betaine, the relatively small percentage of nitrogen made available through betaine, and that betaine was historically not known to be an organic fertilizer nutrient.

According to this long standing teaching in the art, the use of betaine as a fertilizer was prohibitively expensive so it was considered more cost effective for a user seeking fertilizer to purchase urea, which contains a higher percentage of nitrogen than betaine, than to purchase betaine. Consequently, given the expense of betaine and its relatively small percentage of nitrogen, traditional agriculture largely ignored betaine as a viable fertilizer. However, as a result of extensive research and experimentation, the Inventor discovered the unexpected result that properly processed, betaine can meet the USDA National Organic Program standards set forth above, and therefore can be used as an organic fertilizer. Once the Inventor realized that betaine can be processed to meet the USDA National Organic Program standards for an organic fertilizer, the Inventor realized that betaine has a special use and special value as an organic nitrogen source and that this discovered property more than justifies its expense.

In one embodiment, once a quantity of betaine is obtained at OBTAIN BETAINE OPERATION 103, process flow proceeds to CREATE A BETAINE BASED ORGANIC FERTILIZER PRODUCT OPERATION 105.

In one embodiment, at CREATE A BETAINE BASED ORGANIC FERTILIZER PRODUCT OPERATION 105 a betaine based organic fertilizer product is created.

In one embodiment, at CREATE A BETAINE BASED ORGANIC FERTILIZER PRODUCT OPERATION 105, a betaine based organic fertilizer product is created by applying/adding the obtained betaine of OBTAIN BETAINE OPERATION 103 directly to the agricultural vegetation and/or the fields/soil/substrate supporting the agricultural vegetation.

In one embodiment, a betaine based organic fertilizer product is created at CREATE A BETAINE BASED ORGANIC FERTILIZER PRODUCT OPERATION 105 by applying/adding the obtained betaine directly to the agricultural vegetation and/or the fields/soil/substrate supporting the agricultural vegetation in a concentration of greater than 90% betaine.

In one embodiment, a betaine based organic fertilizer product is created at CREATE A BETAINE BASED ORGANIC FERTILIZER PRODUCT OPERATION 105 by applying/adding the obtained betaine directly to the agricultural vegetation and/or the fields/soil/substrate supporting the agricultural vegetation in a concentration of 100% betaine.

In one embodiment, at CREATE A BETAINE BASED ORGANIC FERTILIZER PRODUCT OPERATION 105, a betaine based organic fertilizer product is created by adding the betaine obtained at OBTAIN BETAINE OPERATION 103 directly to an irrigation system servicing the agricultural vegetation.

In one embodiment, a betaine based organic fertilizer product is created at CREATE A BETAINE BASED ORGANIC FERTILIZER PRODUCT OPERATION 105 by adding betaine in a concentration of greater than 90% directly to an irrigation system servicing the agricultural vegetation.

In one embodiment, a betaine based organic fertilizer product is created at CREATE A BETAINE BASED ORGANIC FERTILIZER PRODUCT OPERATION 105 by adding 100% betaine directly to an irrigation system servicing the agricultural vegetation.

In one embodiment, at CREATE A BETAINE BASED ORGANIC FERTILIZER PRODUCT OPERATION 105, a betaine based organic fertilizer product is created by adding betaine to a liquid base, such as water or any other liquid or mixture, to obtain a desired concentration of betaine. In one embodiment, the desired concentration of betaine is 20% to 60%.

In one embodiment, at CREATE A BETAINE BASED ORGANIC FERTILIZER PRODUCT OPERATION 105 a betaine based organic fertilizer product is created by adding the obtained betaine of OBTAIN BETAINE OPERATION 103 to a semi-liquid base and/or mixing the obtained betaine with one or more solids or semi-solids to achieve a desired concentration of betaine. In one embodiment, the desired concentration of betaine is 20% to 60%.

In one embodiment, once a betaine based organic fertilizer product is created at CREATE A BETAINE BASED ORGANIC FERTILIZER PRODUCT OPERATION 105, process flow proceeds to DELIVER AND/OR APPLY THE BETAINE BASED ORGANIC FERTILIZER PRODUCT OPERATION 107.

In one embodiment, at DELIVER AND/OR APPLY THE BETAINE BASED ORGANIC FERTILIZER PRODUCT OPERATION 107, the betaine based organic fertilizer product of CREATE A BETAINE BASED ORGANIC FERTILIZER PRODUCT OPERATION 105 is transferred in bulk to a tanker truck and/or disposed into drums for delivery of smaller quantities of the betaine based organic fertilizer product. In one embodiment, at DELIVER AND/OR APPLY THE BETAINE BASED ORGANIC FERTILIZER PRODUCT OPERATION 107, the betaine based organic fertilizer product of CREATE A BETAINE BASED ORGANIC FERTILIZER PRODUCT OPERATION 105 is then delivered to farms for application to agricultural vegetation.

In one embodiment, at DELIVER AND/OR APPLY THE BETAINE BASED ORGANIC FERTILIZER PRODUCT OPERATION 107, a quantity of the betaine based organic fertilizer product of CREATE A BETAINE BASED ORGANIC FERTILIZER PRODUCT OPERATION 105 is offloaded into plastic field tanks located at or near the application site. In one embodiment, at DELIVER AND/OR APPLY THE BETAINE BASED ORGANIC FERTILIZER PRODUCT OPERATION 107, the plastic field tanks are then used to feed the betaine based organic fertilizer product of CREATE A BETAINE BASED ORGANIC FERTILIZER PRODUCT OPERATION 105 into an irrigation stream either by direct injection or by vacuum drawing from the irrigation flow.

Depending on the particular agricultural vegetation requirements, the application rate of the betaine based organic fertilizer product of CREATE A BETAINE BASED ORGANIC FERTILIZER PRODUCT OPERATION 105 at DELIVER AND/OR APPLY THE BETAINE BASED ORGANIC FERTILIZER PRODUCT OPERATION 107 may be anywhere in a range of approximately 5 to 400 gallons per acre.

In one embodiment, at DELIVER AND/OR APPLY THE BETAINE BASED ORGANIC FERTILIZER PRODUCT OPERATION 107 the betaine based organic fertilizer product of CREATE A BETAINE BASED ORGANIC FERTILIZER PRODUCT OPERATION 105 may also be directly sprayed onto the agricultural vegetation without concerns of plant burning as may occur with more concentrated inorganic fertilizers.

In one embodiment, once the betaine based organic fertilizer product of CREATE A BETAINE BASED ORGANIC FERTILIZER PRODUCT OPERATION 105 is delivered and applied at DELIVER AND/OR APPLY THE BETAINE BASED ORGANIC FERTILIZER PRODUCT OPERATION 107, process flow proceeds to EXIT OPERATION 130 and process for organic fertilization of agricultural vegetation using betaine 100 is exited.

Using process for organic fertilization of agricultural vegetation using betaine 100, contrary to conventional teachings, a betaine based organic fertilizer product is provided that: is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

Consequently, using process for organic fertilization of agricultural vegetation using betaine 100, the previously undiscovered use of betaine as a certified organic fertilizer nutrient is disclosed, thereby disclosing a new use for betaine in contrast to prior art teachings and providing a solution to the long standing problem of finding new sources of organic fertilizer nutrients and new methods of organic fertilization.

In accordance with one embodiment, a process for production of a betaine and fish fertilizer by-product based fertilizer product is created by mixing betaine, a by-product of the de-sugaring of beet molasses, and fish fertilizer by-product, a by-product of the production of fish meal. In one embodiment, the raw mixture of betaine and fish fertilizer by-product is then heat treated and, in one embodiment, optionally filtered to remove suspended particular matter. In one embodiment, the heat treated mixture of betaine and fish fertilizer by-product is then cooled to yield the betaine and fish fertilizer by-product based fertilizer product. In one embodiment, the betaine and fish fertilizer by-product based fertilizer product is then applied to agricultural vegetation, either directly or by inclusion in an irrigation stream.

Figure 2:
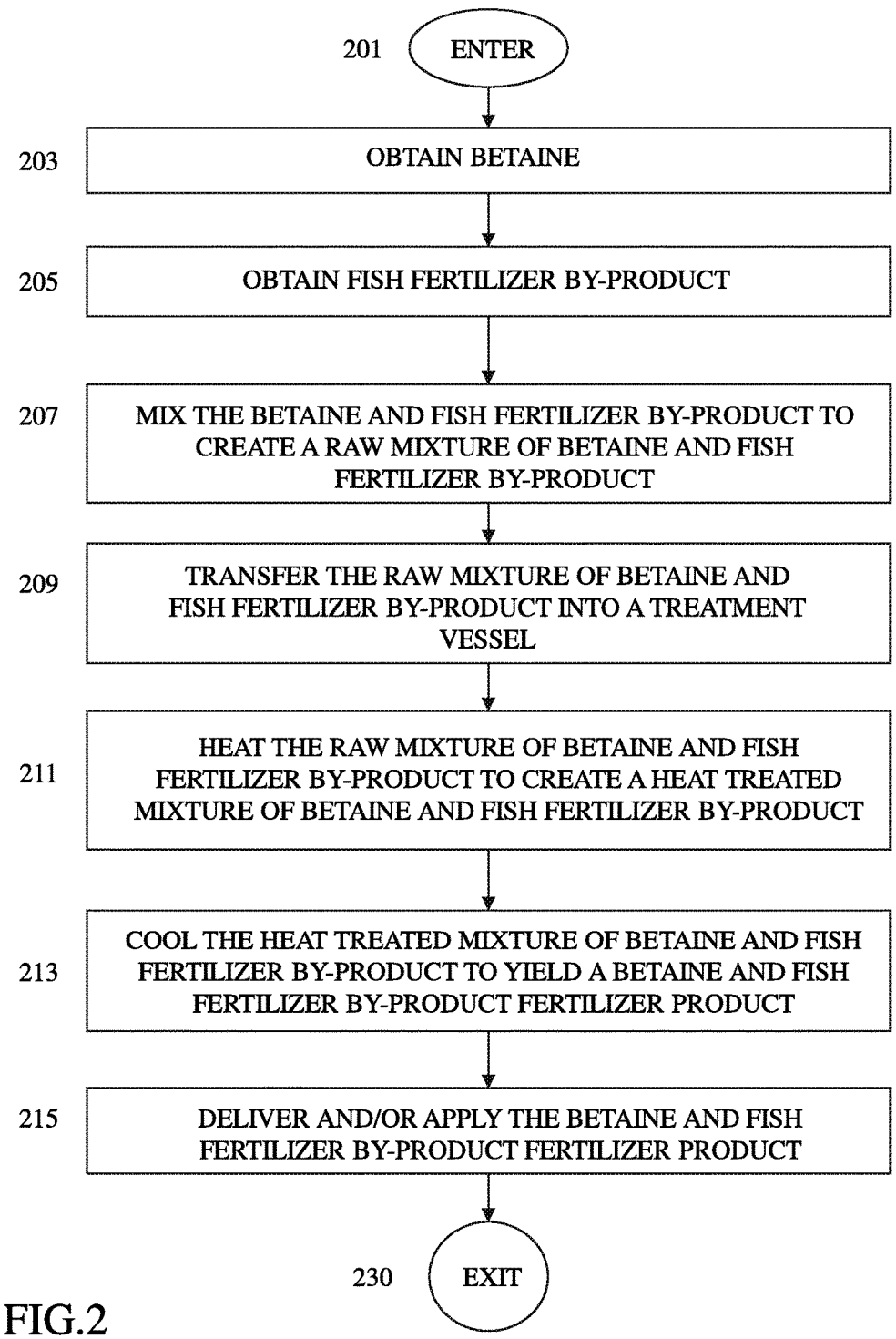
FIG. 2 is a flow chart of a process for creating a betaine and fish fertilizer by-product based fertilizer product in accordance with one embodiment.

FIG. 2 is a flow chart of a process for production of a betaine and fish fertilizer by-product based fertilizer product 200 in accordance with one embodiment. As shown in FIG. 2, process for production of a betaine and fish fertilizer by-product based fertilizer product 200 begins at enter operation 201 and process flow proceeds to OBTAIN BETAINE OPERATION 203.

In one embodiment, at OBTAIN BETAINE OPERATION 203 a quantity of betaine is obtained.

Betaine is an N-trimethylated amino acid, and, historically, has been commonly used as a feed additive for many animal species.

When beet molasses is de-sugared by chromatographic extraction techniques, two by-products are produced: concentrated molasses solids and betaine. Thus, betaine is a by-product of the de-sugaring of beet molasses and therefore is readily available. In the chromatic extraction desugaring process, considerable amounts of high-purity betaine are recovered and used as liquid animal feed supplements.

A discussion of the improved chromatographic separation process currently practiced by many sugar refiners is provided in "Raw Juice Chromatographic Separation Process" published in the Proceedings from the 28th Biennial ASSBT Meeting, Operations, New Orleans, La., Mar. 8-11, 1995, by Kearney, Kochergin, Petersen, Velasquez and Jacob of Amalgamated Research Inc.

Conventionally, the use of betaine as a fertilizer is very expensive. Thus, traditional teaching was that it was more cost effective for a user seeking fertilizer to purchase urea, which contains a higher percentage of nitrogen than betaine, than to purchase betaine. Given the expense of betaine and its relatively small percentage of nitrogen, traditional agriculture largely ignored betaine as a viable fertilizer. However, as a result of extensive research and experimentation, the Inventor discovered the unexpected result that properly processed, betaine can meet the USDA National Organic Program standards and therefore can be used as an organic fertilizer.

Once the Inventor realized that betaine meets the USDA National Organic Program standards for an organic fertilizer, the Inventor realized that betaine has a special use and special value as a nitrogen source that more than justifies its expense.

Furthermore, according to traditional teachings in the art, betaine was actually considered unattractive as a fertilizer because it has a pH of approximately 9.2. However, through experimentation and testing, the Inventor discovered that, contrary to tradition teachings, by mixing betaine with fish fertilizer by-product, betaine becomes a component of an extremely effective fertilizer with a neutral, or at least closer to neutral, pH.

Ultimately, the present Inventor discovered that the combination of betaine and fish by-product improves the efficacy of each component substance beyond what would be expected as traditionally taught by those of skill in the art. In essence, the resulting whole is greater than the sum of its parts. This efficacy results from both processed and non-processed combinations of betaine, and betaine and fish by-product.

Returning to FIG. 2, once a quantity of betaine is obtained at OBTAIN BETAINE OPERATION 203, process flow proceeds to OBTAIN FISH FERTILIZER BY-PRODUCT OPERATION 205.

In one embodiment, at OBTAIN FISH FERTILIZER BY-PRODUCT OPERATION 205 fish fertilizer by-product is obtained.

As noted above, in various embodiments, fish fertilizer by-product includes, but is not limited to, fish meal and/or a viscous liquid by-product from the production of fish meal. Consequently, fish fertilizer by-product is also readily available.

In one embodiment, once fish fertilizer by-product is obtained at OBTAIN FISH FERTILIZER BY-PRODUCT OPERATION 205, process flow proceeds to MIX THE BETAINE AND FISH FERTILIZER BY-PRODUCT TO CREATE A RAW MIXTURE OF BETAINE AND FISH FERTILIZER BY-PRODUCT OPERATION 207.

In one embodiment, at MIX THE BETAINE AND FISH FERTILIZER BY-PRODUCT TO CREATE A RAW MIXTURE OF BETAINE AND FISH FERTILIZER BY-PRODUCT OPERATION 207 the fish fertilizer by-product is mixed with the betaine.

In various embodiments, at MIX THE BETAINE AND FISH FERTILIZER BY-PRODUCT TO CREATE A RAW MIXTURE OF BETAINE AND FISH FERTILIZER BY-PRODUCT OPERATION 207 the fish fertilizer by-product is mixed with the betaine such that the resulting raw mixture of betaine and fish fertilizer by-product is any desired percentage concentration of fish fertilizer by-product, typically as determined by cost and the specific needs of the user.

In one embodiment, the fish fertilizer by-product is mixed with the betaine such that the resulting raw mixture of betaine and fish fertilizer by-product is 70% to 80% fish fertilizer by-product and 30% to 20% betaine. In one embodiment, the fish fertilizer by-product is added to the betaine such that the resulting raw mixture of betaine and fish fertilizer by-product is 40% to 60% fish fertilizer by-product and 60% to 40% betaine. In other embodiments, the betaine is added to the fish fertilizer by-product such that the resulting raw mixture of betaine and fish fertilizer by-product is any desired percentage concentration of betaine and fish fertilizer by-product.

In one embodiment, once the fish fertilizer by-product is mixed with the betaine at MIX THE BETAINE AND FISH FERTILIZER BY-PRODUCT TO CREATE A RAW MIXTURE OF BETAINE AND FISH FERTILIZER BY-PRODUCT OPERATION 207 to create a raw mixture of betaine and fish fertilizer by-product, process flow proceeds to TRANSFER THE RAW MIXTURE OF BETAINE AND FISH FERTILIZER BY-PRODUCT INTO A TREATMENT VESSEL OPERATION 209.

In one embodiment, at TRANSFER THE RAW MIXTURE OF BETAINE AND FISH FERTILIZER BY-PRODUCT INTO A TREATMENT VESSEL OPERATION 209 the raw mixture of betaine and fish fertilizer by-product of MIX THE BETAINE AND FISH FERTILIZER BY-PRODUCT TO CREATE A RAW MIXTURE OF BETAINE AND FISH FERTILIZER BY-PRODUCT OPERATION 207 is placed in a treatment vessel.

In one embodiment, at TRANSFER THE RAW MIXTURE OF BETAINE AND FISH FERTILIZER BY-PRODUCT INTO A TREATMENT VESSEL OPERATION 209 the raw mixture of betaine and fish fertilizer by-product is filtered as the raw mixture of betaine and fish fertilizer by-product is being disposed into the treatment vessel. In one embodiment, this filtering is optional, as the amount of suspended particular matter has been found to be minimal. If pre-treatment filtration is desired, a stainless steel, or other suitable material, mesh having a mesh size number between 50 and 200 may be employed. In one embodiment, the mesh size is 200.

In one embodiment, the treatment vessel of TRANSFER THE RAW MIXTURE OF BETAINE AND FISH FERTILIZER BY-PRODUCT INTO A TREATMENT VESSEL OPERATION 209 is an insulated stainless steel tank having electrically powered heat strips applied thereto. However, the tank construction and heating mechanism are not critical to the treatment process. For example, in one embodiment, at TRANSFER THE RAW MIXTURE OF BETAINE AND FISH FERTILIZER BY-PRODUCT INTO A TREATMENT VESSEL OPERATION 209 the treatment vessel is a carbon steel tank which is heated by steam supplied by a package boiler or cogeneration facility. Moreover, the slightly basic pH of the mixture of betaine and fish fertilizer by-product is not considered particularly corrosive to the metals commonly used in the construction of metal treatment vessels. One skilled in the art will appreciate that other non-metallic treatment vessels may be employed as well at TRANSFER THE RAW MIXTURE OF BETAINE AND FISH FERTILIZER BY-PRODUCT INTO A TREATMENT VESSEL OPERATION 209.

In one embodiment, once the raw mixture of betaine and fish fertilizer by-product is placed in a treatment vessel at TRANSFER THE RAW MIXTURE OF BETAINE AND FISH FERTILIZER BY-PRODUCT INTO A TREATMENT VESSEL OPERATION 209, process flow proceeds to HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211.

In one embodiment, at HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 the raw mixture of betaine and fish fertilizer by-product of MIX THE BETAINE AND FISH FERTILIZER BY-PRODUCT TO CREATE A RAW MIXTURE OF BETAINE AND FISH FERTILIZER BY-PRODUCT OPERATION 207 is mechanically heated.

In one embodiment, at HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 heat is applied to the raw mixture of betaine and fish fertilizer by-product in order to raise the average temperature of the raw mixture of betaine and fish fertilizer by-product to, in one embodiment, at least 130 degrees F.

In one embodiment, at HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 heat is added until the average temperature of the raw mixture of betaine and fish fertilizer by-product is raised to approximately 130 degrees F. or more. This temperature range is known to inhibit pathogenic bacterial growth of the most common pathogens such as *Escherichia coli* 0157:H7 and *Salmonella*.

In one embodiment, at HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 the mixture of betaine and fish fertilizer by-product is maintained in the treatment vessel at or above 130 degrees F. for at least 24 hours to ensure uniform heat transfer to the mixture of betaine and fish fertilizer by-product. In one embodiment, to aid in uniform heat transfer, an agitator or pumped recirculation flow may be employed at APPLY HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 as part of the treatment process. In one embodiment, if an agitator or pumped recirculation flow is used to maintain the uniform heat treatment, filtration may also be accomplished concurrently at APPLY HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 by placement of a suitable filter screen as discussed above, into the recirculation flow path. In one embodiment, the heat treatment of APPLY HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 may be performed for 120 hours or more, if desired. However, for energy conservation reasons 24 to 48 hours of heat treatment is believed to be adequate.

In one embodiment, water may be blended with the heat treated mixture of betaine and fish fertilizer by-product at APPLY HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 to meet the desired nitrogen per weight or volume requirements of the mixture of betaine and fish fertilizer by-product. In one embodiment, water may also be used to recover losses due to evaporation during the heat treatment process of APPLY HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211. However, water blending is typically not required, but is rather an optional procedure.

In one embodiment, once the raw mixture of betaine and fish fertilizer by-product of MIX THE BETAINE AND FISH FERTILIZER BY-PRODUCT TO CREATE A RAW MIXTURE OF BETAINE AND FISH FERTILIZER BY-PRODUCT OPERATION 207 is heat treated in the treatment vessel of TRANSFER THE RAW MIXTURE OF BETAINE AND FISH FERTILIZER BY-PRODUCT INTO A TREATMENT VESSEL OPERATION 209 at HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 to create a heat treated mixture of betaine and fish fertilizer by-product, process flow proceeds to COOL THE HEAT TREATED MIXTURE OF BETAINE AND FISH FERTILIZER BY-PRODUCT TO YIELD A BETAINE AND FISH FERTILIZER BY-PRODUCT FERTILIZER PRODUCT OPERATION 213.

In one embodiment, at COOL THE HEAT TREATED MIXTURE OF BETAINE AND FISH FERTILIZER BY-PRODUCT TO YIELD A BETAINE AND FISH FERTILIZER BY-PRODUCT FERTILIZER PRODUCT OPERATION 213 the heat treated mixture of betaine and fish fertilizer by-product of HEAT THE RAW MIXTURE OF BETAINE AND FISH FERTILIZER BY-PRODUCT TO CREATE A HEAT TREATED MIXTURE OF BETAINE AND FISH FERTILIZER BY-PRODUCT OPERATION 211 is allowed to cool in the treatment vessel of TRANSFER THE RAW MIXTURE OF BETAINE AND FISH FERTILIZER BY-PRODUCT INTO A TREATMENT VESSEL OPERATION 209.

As noted, in one embodiment, the cooling at COOL THE HEAT TREATED MIXTURE OF BETAINE AND FISH FERTILIZER BY-PRODUCT TO YIELD A BETAINE AND FISH FERTILIZER BY-PRODUCT FERTILIZER PRODUCT OPERATION 213 yields the resulting betaine and fish fertilizer by-product based fertilizer product.

In one embodiment, once the heat treated mixture of betaine and fish fertilizer by-product is cooled at COOL THE HEAT TREATED MIXTURE OF BETAINE AND FISH FERTILIZER BY-PRODUCT TO YIELD A BETAINE AND FISH FERTILIZER BY-PRODUCT FERTILIZER PRODUCT OPERATION 213 to yield the betaine and fish fertilizer by-product based fertilizer product, process flow proceeds to DELIVER AND/OR APPLY THE BETAINE AND FISH FERTILIZER BY-PRODUCT FERTILIZER PRODUCT OPERATION 215.

In one embodiment, at DELIVER AND/OR APPLY THE BETAINE AND FISH FERTILIZER BY-PRODUCT FERTILIZER PRODUCT OPERATION 215 the betaine and fish fertilizer by-product based fertilizer product is transferred in bulk to a tanker truck and/or disposed into drums for delivery of smaller quantities of the betaine and fish fertilizer by-product based fertilizer product. In one embodiment, at DELIVER AND/OR APPLY THE BETAINE AND FISH FERTILIZER BY-PRODUCT FERTILIZER PRODUCT OPERATION 215, the betaine and fish fertilizer by-product based fertilizer product is then delivered to farms for application to agricultural vegetation.

In one embodiment, at DELIVER AND/OR APPLY THE BETAINE AND FISH FERTILIZER BY-PRODUCT FERTILIZER PRODUCT OPERATION 215, a quantity of the betaine and fish fertilizer by-product based fertilizer product is offloaded into plastic field tanks located at or near the application site. In one embodiment, at DELIVER AND/OR APPLY THE BETAINE AND FISH FERTILIZER BY-PRODUCT FERTILIZER PRODUCT OPERATION 215, the plastic field tanks are then used to feed the resulting betaine and fish fertilizer by-product based fertilizer product into the irrigation stream either by direct injection or by vacuum drawing from the irrigation flow.

Depending on the particular agricultural vegetation requirements, the application rate of the resulting betaine and fish fertilizer by-product based fertilizer product at DELIVER AND/OR APPLY THE BETAINE AND FISH FERTILIZER BY-PRODUCT FERTILIZER PRODUCT OPERATION 215, may be anywhere in a range of approximately 5 to 400 gallons per acre.

In one embodiment, at DELIVER AND/OR APPLY THE BETAINE AND FISH FERTILIZER BY-PRODUCT FERTILIZER PRODUCT OPERATION 215, the resulting betaine and fish fertilizer by-product based fertilizer product may also be directly sprayed onto the agricultural vegetation without concerns of plant burning as may occur with more concentrated inorganic fertilizers.

In one embodiment, once the betaine and fish fertilizer by-product based fertilizer product is delivered and applied at DELIVER AND/OR APPLY THE BETAINE AND FISH FERTILIZER BY-PRODUCT FERTILIZER PRODUCT OPERATION 215, process flow proceeds to EXIT OPERATION 230 and process for creating a betaine and fish fertilizer by-product based fertilizer product 200 is exited.

Using process for production of a betaine and fish fertilizer by-product based fertilizer product 200, a betaine and fish fertilizer by-product based fertilizer product is provided that is environmentally benign; is non-pathogenic; is derived from natural organic sources; does not require significant processing; has minimal odor; has a low viscosity liquid form; can be applied directly to agricultural vegetation; can be injected and/or added into irrigation streams; includes time-released nitrogen components which become bioavailable to agricultural vegetation by beneficial microbial digestion in soil; and eliminates chemical crop burning.

It should be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In the discussion above, certain aspects of one embodiment include process steps and/or operations described herein for illustrative purposes in a particular order and/or grouping. However, the particular order and/or grouping shown and discussed herein are illustrative only and not limiting. Those of skill in the art will recognize that other orders and/or grouping of the process steps and/or operations are possible and, in some embodiments, one or more of the process steps and/or operations discussed above can be combined and/or deleted. In addition, portions of one or more of the process steps and/or operations can be re-grouped as portions of one or more other of the process steps and/or operations discussed herein. Consequently, the particular order and/or grouping of the process steps and/or operations discussed herein do not limit the scope of the invention as claimed below.

In addition, the operations shown in the FIG.s are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A process of manufacturing a betaine and fish fertilizer by-product based fertilizer product comprising:
    obtaining a quantity of betaine;
    obtaining a quantity of fish fertilizer by-product;
    mixing at least part of the quantity of betaine and at least part of the quantity of fish fertilizer by-product to yield a raw mixture of betaine and fish fertilizer by-product;
    heat treating the raw mixture of betaine and fish fertilizer by-product to yield a heat treated mixture of betaine and fish fertilizer by-product; and
    cooling the heat treated mixture of betaine and fish fertilizer by-product to yield the betaine and fish fertilizer by-product based fertilizer product.

2. The process of manufacturing a betaine and fish fertilizer by-product based fertilizer product of claim 1, wherein;
    the betaine is a by-product of a process for the de-sugaring of beet molasses.

3. The process of manufacturing a betaine and fish fertilizer by-product based fertilizer product of claim 1, wherein;
    the fish fertilizer by-product is a liquid fish fertilizer by-product.

4. The process of manufacturing a betaine and fish fertilizer by-product based fertilizer product of claim 1, wherein;
    the fish fertilizer by-product is a solid and/or semi-solid fish fertilizer by-product.

5. The process of manufacturing a betaine and fish fertilizer by-product based fertilizer product of claim 1, wherein;
    mixing at least part of the quantity of betaine and at least part of the quantity of fish fertilizer by-product to yield a raw mixture of betaine and fish fertilizer by-product comprises mixing at least part of the quantity of betaine and at least part of the quantity of fish fertilizer by-product to yield a raw mixture of betaine and fish fertilizer by-product that is 20% to 30% betaine.

6. The process of manufacturing a betaine and fish fertilizer by-product based fertilizer product of claim 1, wherein;
    mixing at least part of the quantity of betaine and at least part of the quantity of fish fertilizer by-product to yield a raw mixture of betaine and fish fertilizer by-product comprises mixing at least part of the quantity of betaine and at least part of the quantity of fish fertilizer by-product to yield a raw mixture of betaine and fish fertilizer by-product that is 40% to 60% fish fertilizer by-product.

7. The process of manufacturing a betaine and fish fertilizer by-product based fertilizer product of claim 1, wherein;
    heat treating the raw mixture of betaine and fish fertilizer by-product to yield a heat treated mixture of betaine and fish fertilizer by-product comprises heating the raw mixture of betaine and fish fertilizer by-product to 130 degrees F. for at least 4 hours.

8. The process of manufacturing a betaine and fish fertilizer by-product based fertilizer product of claim 1, wherein;
    heat treating the raw mixture of betaine and fish fertilizer by-product to yield a heat treated mixture of betaine and fish fertilizer by-product comprises heating the raw mixture of betaine and fish fertilizer by-product to a range of about 130 to 200 degrees F. for 4 to 120 hours.

9. The process of manufacturing a betaine and fish fertilizer by-product based fertilizer product of claim 1, further comprising:
    filtering the quantity of mixture of betaine and fish fertilizer by-product using a filter having a standard wire mesh size number of 200.

10. The process of manufacturing a betaine and fish fertilizer by-product based fertilizer product of claim 1, further comprising:
    filtering the quantity of mixture of betaine and fish fertilizer by-product using a filter having a standard wire mesh size number in a range of 50 to 200.

11. The process of manufacturing a betaine and fish fertilizer by-product based fertilizer product of claim 1, further comprising:
    filtering the quantity of heat treated mixture of betaine and fish fertilizer by-product using a filter having a standard wire mesh size number of 200.

12. The process of manufacturing a betaine and fish fertilizer by-product based fertilizer product of claim 1, further comprising:
    filtering the quantity of heat treated mixture of betaine and fish fertilizer by-product using a filter having a standard wire size number in a range of 50 to 200.

13. The process of manufacturing a betaine and fish fertilizer by-product based fertilizer product of claim 1, wherein;
    the betaine and fish fertilizer by-product based fertilizer product includes a nitrogen content in a range of 2 to 5 percent.

14. The process of manufacturing a betaine and fish fertilizer by-product based fertilizer product of claim 1, wherein;
    the betaine and fish fertilizer by-product based fertilizer product includes a phosphate content in a range of 0.5 to 2.5 percent.

15. The process of manufacturing a betaine and fish fertilizer by-product based fertilizer product of claim 1, wherein;
    the betaine and fish fertilizer by-product based fertilizer product includes a potash content in a range of 1 to 7 percent.

16. A betaine and fish fertilizer by-product based fertilizer product comprising:
    a heat treated mixture of betaine and fish fertilizer by-product, wherein the heat treated mixture of betaine and fish fertilizer by-product is created by heating a combination of raw betaine and fish fertilizer by-product.

17. The betaine and fish fertilizer by-product based fertilizer product of claim 16, wherein;
    the betaine is a by-product of a process for the de-sugaring of beet molasses.

18. The betaine and fish fertilizer by-product based fertilizer product of claim 16, wherein;
    the fish fertilizer by-product is a liquid fish fertilizer by-product.

19. The betaine and fish fertilizer by-product based fertilizer product of claim 16, wherein;

the fish fertilizer by-product is a solid and/or semi-solid fish fertilizer by-product.

20. The betaine and fish fertilizer by-product based fertilizer product of claim 16, wherein;
the betaine and fish fertilizer by-product based fertilizer product is 20% to 30% betaine.

21. The betaine and fish fertilizer by-product based fertilizer product of claim 16, wherein;
the betaine and fish fertilizer by-product based fertilizer product is 40% to 60% heat treated fish fertilizer by-product.

22. The betaine and fish fertilizer by-product based fertilizer product of claim 16, wherein;
the heat treated mixture of betaine and fish fertilizer by-product is heat treated to 130 degrees F. for at least 4 hours.

23. The betaine and fish fertilizer by-product based fertilizer product of claim 16, wherein;
the heat treated mixture of betaine and fish fertilizer by-product is heat treated to a range of about 130 to 200 degrees F. for 4 to 120 hours.

24. The betaine and fish fertilizer by-product based fertilizer product of claim 16, wherein;
the heat treated mixture of betaine and fish fertilizer by-product includes a nitrogen content in a range of 2 to 5 percent.

25. The betaine and fish fertilizer by-product based fertilizer product of claim 16, wherein;
the heat treated mixture of betaine and fish fertilizer by-product includes a phosphate content in a range of 0.5 to 2.5 percent.

26. The betaine and fish fertilizer by-product based fertilizer product of claim 16, wherein;
the heat treated mixture of betaine and fish fertilizer by-product includes a potash content in a range of 1 to 7 percent.

27. A process for fertilizing agricultural vegetation comprising:
obtaining a quantity of betaine;
obtaining a quantity of fish fertilizer by-product;
mixing at least part of the quantity of betaine and at least part of the quantity of fish fertilizer by-product to yield a raw mixture of betaine and fish fertilizer by-product;
heat treating the raw mixture of betaine and fish fertilizer by-product to yield a heat treated mixture of betaine and fish fertilizer by-product;
cooling the heat treated mixture of betaine and fish fertilizer by-product to yield the betaine and fish fertilizer by-product based fertilizer product; and
applying the betaine and fish fertilizer by-product based fertilizer product to the agricultural vegetation.

28. The process for fertilizing agricultural vegetation of claim 27, wherein;
the betaine is a by-product of a process for the de-sugaring of beet molasses.

29. The process for fertilizing agricultural vegetation of claim 27, wherein;
the fish fertilizer by-product is a liquid fish fertilizer by-product.

30. The process for fertilizing agricultural vegetation of claim 27, wherein;
the fish fertilizer by-product is a solid and/or semi-solid fish fertilizer by-product.

31. The process for fertilizing agricultural vegetation of claim 27, wherein;
mixing at least part of the quantity of betaine and at least part of the quantity of fish fertilizer by-product to yield a raw mixture of betaine and fish fertilizer by-product comprises mixing at least part of the quantity of betaine and at least part of the quantity of fish fertilizer by-product to yield a raw mixture of betaine and fish fertilizer by-product that is 20% to 30% betaine.

32. The process for fertilizing agricultural vegetation of claim 27, wherein;
mixing at least part of the quantity of betaine and at least part of the quantity of fish fertilizer by-product to yield a raw mixture of betaine and fish fertilizer by-product comprises mixing at least part of the quantity of betaine and at least part of the quantity of fish fertilizer by-product to yield a raw mixture of betaine and fish fertilizer by-product that is 40% to 60% fish fertilizer by-product.

33. The process for fertilizing agricultural vegetation of claim 27, wherein;
heat treating the raw mixture of betaine and fish fertilizer by-product to yield a heat treated mixture of betaine and fish fertilizer by-product comprises heating the raw mixture of betaine and fish fertilizer by-product to 130 degrees F. for at least 4 hours.

34. The process for fertilizing agricultural vegetation of claim 27, wherein;
heat treating the raw mixture of betaine and fish fertilizer by-product to yield a heat treated mixture of betaine and fish fertilizer by-product comprises heating the raw mixture of betaine and fish fertilizer by-product to a range of about 130 to 200 degrees F. for 4 to 120 hours.

35. The process for fertilizing agricultural vegetation of claim 27, further comprising;
filtering the quantity of mixture of betaine and fish fertilizer by-product using a filter having a standard wire mesh size number of 200.

36. The process for fertilizing agricultural vegetation of claim 27, further comprising;
filtering the quantity of mixture of betaine and fish fertilizer by-product using a filter having a standard wire mesh size number in a range of 50 to 200.

37. The process for fertilizing agricultural vegetation of claim 27, further comprising;
filtering the quantity of heat treated mixture of betaine and fish fertilizer by-product using a filter having a standard wire mesh size number of 200.

38. The process for fertilizing agricultural vegetation of claim 27, further comprising;
filtering the quantity of heat treated mixture of betaine and fish fertilizer by-product using a filter having a standard wire mesh size number in a range of 50 to 200.

39. The process for fertilizing agricultural vegetation of claim 27, wherein;
the betaine and fish fertilizer by-product based fertilizer product includes a nitrogen content in a range of 2 to 5 percent.

40. The process for fertilizing agricultural vegetation of claim 27, wherein;
the betaine and fish fertilizer by-product based fertilizer product includes a phosphate content in a range of 0.5 to 2.5 percent.

41. The process for fertilizing agricultural vegetation of claim 27, wherein;
the betaine and fish fertilizer by-product based fertilizer product includes a potash content in a range of 1 to 7 percent.

42. The process for fertilizing agricultural vegetation of claim 27, wherein;

applying the betaine and fish fertilizer by-product based fertilizer product to the agricultural vegetation comprises applying the betaine and fish fertilizer by-product based fertilizer product at a rate of 5 to 400 gallons per acre.

43. A method for organic fertilization of agricultural vegetation using betaine comprising:
obtaining a quantity of betaine;
obtaining a quantity of fish fertilizer by-product;
combining the quantity of betaine and the quantity of fish fertilizer by-product to create a betaine based organic fertilizer product; and
applying the betaine based organic fertilizer product to agricultural vegetation.

44. The method for organic fertilization of agricultural vegetation using betaine of claim 43 wherein the betaine based organic fertilizer product is greater than 90% betaine.

45. The method for organic fertilization of agricultural vegetation using betaine of claim 43 wherein the betaine based organic fertilizer product is less than 100% betaine.

46. The method for organic fertilization of agricultural vegetation using betaine of claim 43 wherein the obtained betaine is a by-product of a process for the de-sugaring of beet molasses.

47. The method for organic fertilization of agricultural vegetation using betaine of claim 43 wherein the betaine based organic fertilizer product is added to an irrigation system servicing the agricultural vegetation.

48. The method for organic fertilization of agricultural vegetation using betaine of claim 43 wherein the betaine based organic fertilizer product is created by adding the obtained betaine to a liquid base to obtain a desired concentration of betaine.

49. The method for organic fertilization of agricultural vegetation using betaine of claim 48 wherein the desired concentration of betaine is 20% to 60%.

50. The method for organic fertilization of agricultural vegetation using betaine of claim 43 wherein the betaine based organic fertilizer product is created by adding the obtained betaine to a semi-liquid base to achieve a desired concentration of betaine.

51. The method for organic fertilization of agricultural vegetation using betaine of claim 50 wherein the desired concentration of betaine is 20% to 60%.

52. The method for organic fertilization of agricultural vegetation using betaine of claim 43 wherein the betaine based organic fertilizer product is created by mixing the obtained betaine with one or more solids or semi-solids to achieve a desired concentration of betaine.

53. The method for organic fertilization of agricultural vegetation using betaine of claim 52 wherein the desired concentration of betaine is 20% to 60%.

54. The method for organic fertilization of agricultural vegetation using betaine of claim 43 wherein applying the betaine based organic fertilizer product to agricultural vegetation includes applying the betaine based organic fertilizer product at a rate of 5 to 400 gallons per acre.

55. The method for organic fertilization of agricultural vegetation using betaine of claim 43 wherein applying the betaine based organic fertilizer product to agricultural vegetation includes applying the betaine based organic fertilizer product directly to the agricultural vegetation.

* * * * *